April 12, 1960  F. A. GAYNOR ET AL  2,932,472
AUTOMATIC TURN COMPENSATOR FOR AIRCRAFT
Filed Sept. 11, 1957
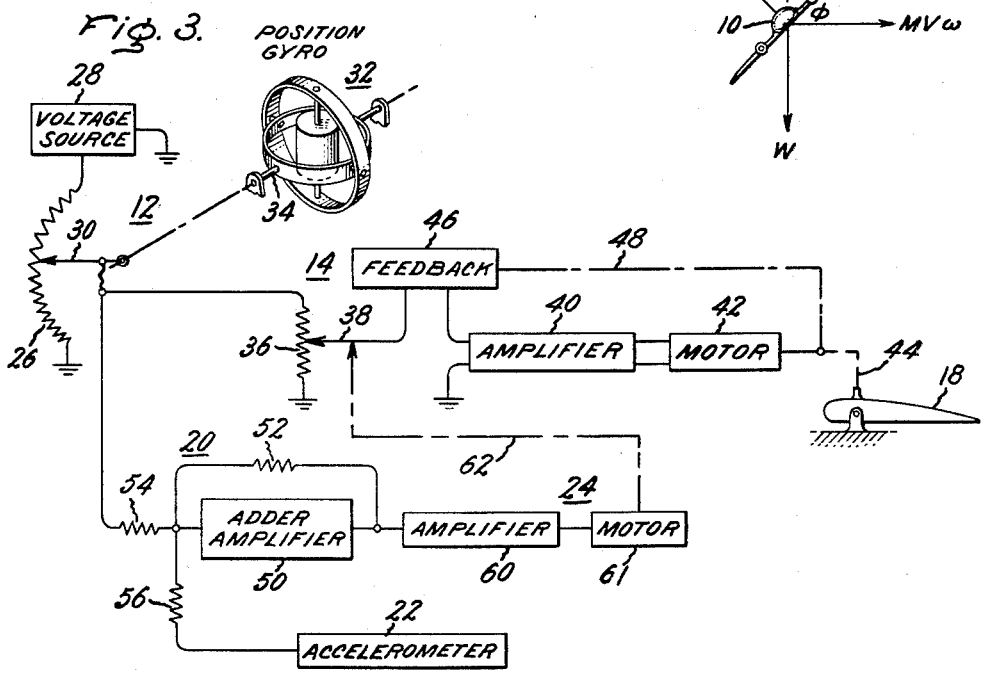
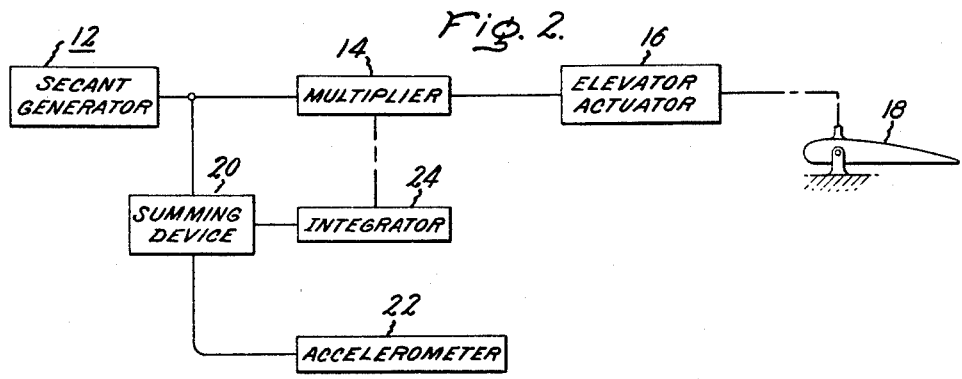
Inventors:
Frank A. Gaynor,
Michael F. Marx,
by Francis K. Doyle
Their Attorney.

United States Patent Office 2,932,472
Patented Apr. 12, 1960

2,932,472

AUTOMATIC TURN COMPENSATOR FOR AIRCRAFT

Frank A. Gaynor and Michael F. Marx, Schenectady, N.Y., assignors to General Electric Company, a corporation of New York Application September 11, 1957, Serial No. 683,333

6 Claims. (Cl. 244—77)

This invention relates to an automatic turn compensator and, more particularly, to an automatic turn compensator which is adapted to maintain an aircraft at constant altitude during turning flight.

As is well known to those skilled in the art, when an aircraft is in a banked attitude the lift of the aircraft must be increased to prevent a loss of altitude. In order to increase the lift of an aircraft, it is necessary that the elevator of such aircraft be deflected. For an aircraft to remain in equilibrium during turning flight, it is necessary that the elevators of such aircraft be deflected in a manner to provide the necessary increase in lift. In manual maneuvering of an aircraft, the human pilot is able to make properly compensated turns by use of a rate of climb indicator. As the human pilot begins to turn his aircraft he checks his rate of climb indicator and provides sufficient elevator deflection to maintain zero rate of climb, thereby maintaining the aircraft at constant altitude.

However, when an aircraft is provided with an automatic pilot or a flight control system, it is desirable to provide an automatic means to enable the aircraft to automatically perform a compensated turn. Since present day aircraft are provided with complex flight control systems, which add to the weight of the aircraft, it is desirable that automatic turning means be provided which are simple in construction and very light in weight. Presently known automatic turning systems require the addition of a number of sensors to the flight control systems of the aircraft, such as Mach meters, altimeters and the like. In addition, transient compensation using a conventional altitude controller is virtually impossible due to the size and suddenness of the altitude disturbance during turning flight. Obviously, such automatic turning systems increase the complexity of the flight control system and also provide considerable additional weight to the aircraft. Therefore, there is presently a need for an automatic turning means which will be very simple in construction and which will add very little weight to the aircraft flight control system. It is desirable to provide such an automatic turning means utilizing the components of the present flight control system to thereby lessen the additional components necessary for the automatic turning means.

Therefore, it is an object of this invention to provide a new and improved automatic turning means for aircraft which is simple in construction and light in weight.

It is a further object of this invention to provide an automatic turning means which will utilize many of the components of the present flight control system.

It is another object of this invention to provide an improved automatic turning means through the addition of a relatively few components to the elevator channel of an automatic pilot to enable such automatic pilot to command compensated turns.

In carrying out this invention in one form, means are provided to generate a first signal proportional to a function of the bank angle at which an aircraft is banked during turning flight. This signal is fed to a multiplier device and the output of the multiplier energizes a control means to position the elevators of the aircraft. Acceleration sensing means are provided which generate a second signal proportional to the normal acceleration of the aircraft. A summing device is provided for combining or summing the first and second signals. The output of the summing device energizes or operates an integrator which is adapted to actuate the multiplier to thereby determine the portion of the first generated signal which is utilized to actuate the control means to position the aircraft elevators. When the first and second signals are equal, the output of the summing device is zero and the integrator is inoperative. At this point the elevators of the aircraft are in a proper position to provide a compensated turn.

This invention and the manner in which its objectives and advantages are obtained will be better understood from the following description taken in connection with the accompanying drawing wherein:

Figure 1 is a diagrammatical sketch of an aircraft in turning flight;

Figure 2 is a schematic diagram in block form showing this invention in one form; and Figure 3 is an electrical schematic diagram, partially in block form, showing one form of this invention applied to the elevator channel of an aircraft flight control system.

Referring to the drawings wherein like numerals are used to indicate like parts throughout, and in particular with reference to Fig. 1 there is shown diagrammatically an aircraft 10 in turning flight. As the aircraft 10 turns at a rate $\omega$ it is banked at an angle $\phi$ as shown. Considering the sum of the forces necessary to keep the aircraft 10 in equilibrium during the turn, it is seen that $$L - MV\omega \sin \phi - W \cos \phi = 0 \qquad (1)$$

where:

W is the aircraft weight;
M is the aircraft mass;
V is the true speed of the aircraft;
L is the aircraft lift; and
$MV\omega$ is the centrifugal force acting on the aircraft.

In order that there be no loss in altitude $$L = MV\omega \sin \phi + W \cos \phi \qquad (2)$$

Also, in order that the aircraft does not side slip during the turn $$MV\omega \cos \phi = W \sin \phi \qquad (3)$$

or $$MV\omega = \frac{W \sin \phi}{\cos \phi} \qquad (4)$$

substituting Equation 4 into Equation 2;

$$L = \frac{W \sin^2 \phi}{\cos \phi} + W \cos \phi \qquad (5)$$

or $$L = \frac{W}{\cos \phi} (\sin^2 \phi + \cos^2 \phi) \qquad (6)$$

therefore:

$$\frac{L}{W} = \frac{1}{\cos \phi} = \sec \phi \qquad (7)$$

Since $$\frac{L}{W}$$

is equal to the load factor or the number of "g's," it follows from Equation 7 that the load factor required to maintain altitude during turning flight is equal to the secant of the bank angle. The weight of the aircraft is essentially constant, therefore, it can be seen that the lift of the aircraft varies as the secant of the bank angle.

Figure 2 shows one embodiment of this invention in block form whereby the requirements of Equation 7 are satisfied. As shown in Figure 2, the aircraft (not shown) is provided with a secant generator 12 which generates a signal proportional to the secant of the bank angle during turning flight. The signal from secant generator 12 is fed to a multiplier 14 and the output of the multiplier 14 drives an elevator actuator 16 to position the elevators 18. The signal from the secant generator 12 is also fed to a summing device 20, where it is combined with a signal generated by an accelerometer 22. Accelerometer 22 generates a signal proportional to the normal acceleration of the aircraft (not shown). Normal acceleration of the aircraft will be understood as meaning acceleration in the lift direction, that is acceleration normal to the chord plane of the wing. This is shown in Figure 1 as arrow L. The output of the summing device 20 energizes or otherwise operates an integrator 24 which actuates the multiplier 14 to determine the portion of the signal generated by the secant generator 12 appearing in the output of the multiplier. When the signal generated by the secant generator 12 is equal to the signal generated by accelerometer 22, the output of the summing device 20 will be zero and, therefore, integrator 24 will be deenergized or otherwise cease to operate. At this point, the proper portion of the signal generated by the secant generator 12 is being used to actuate the elevator actuator 16 and therefore the elevators 18 are in the proper position to provide the additional lift necessary to enable the aircraft to make a compensated turn.

The preferred embodiment of an automatic turn compensator according to this invention is shown in detail in Fig. 3. The secant generator 12 is shown as a non-linear potentiometer 26 which is wound according to the secant function of the bank angle. Potentiometer 26 is connected across a voltage source 28 and the desired voltage signal is picked off the potentiometer 26 by the movable wiper arm 30. The movable wiper arm is positioned on the potentiometer 26 by means of the position gyro 32. As shown, the movable shaft of the gyro 32 is mechanically connected to the wiper arm 30 and as the position gyro 32 moves in accordance with the movement of the aircraft (not shown) the shaft 34 is caused to rotate proportional to the movement of the aircraft, and thereby, move wiper arm 30 proportional to such movement. In this manner, a voltage signal is picked off of the non-linear potentiometer 26 and this signal is proportional to the secant of the angle at which the aircraft banks. The signal from the secant generator 12 is fed to a multiplier device 14, shown in the form of a potentiometer 36 having a movable wiper arm 38. The output of the multiplier 14 is fed to amplifier 40 which energizes a motor 42 to thereby position elevators 18 through a mechanical linkage 44. As is well known to those skilled in the art, position feedback means 46 are provided, actuated by motor 42 through a mechanical linkage 48, to provide the proper position of elevators 18. Rate feedback also may be provided for stabilizing purposes, if desired, in a manner well known in the art.

The signal from the secant generator 12 is also fed to a summing device 20 which is shown as a combining circuit in the form of an adder amplifier 50. The adder amplifier 50 is a high gain amplifier and utilizes a feedback resistor 52. The gain of adder amplifier 50 is the ratio of the feedback resistance to the input resistance, as is well known to those skilled in the art. In this case, the input resistors are shown as resistor 54 in the circuit means which feeds the secant generator signal to amplifier 50 and resistor 56 which feeds an acceleration signal to the amplifier 50. An accelerometer 22 senses the normal acceleration of the aircraft during the turning flight and provides a signal proportional to such acceleration. This signal is fed to the amplifier 50 through input resistor 56 in a degenerative fashion, with reference to the signal from the secant generator 12. The output of adder amplifier 50 energizes integrator 24, shown as a power amplifier 60 and a motor 61. The power amplifier 60 amplifies the output of the combining circuit 50, and this amplified signal energizes the motor 61. The output of motor 61 is coupled to the multiplier 14 through a mechanical linkage 62 and moves the movable wiper 38 of the multiplier 14 along the potentiometer 36. When the signal from the secant generator 12 is equal to the signal from the accelerometer 58, the adder amplifier 50 will have no output and therefore the motor 61 will stop. When the motor 61 stops, the wiper arm 38 will be picking off a fixed voltage from potentiometer 36. This voltage from the multiplier 14 will be exactly equal to the output of the feedback 46, thereby causing motor 42 to be deenergized and maintaining elevators 18 in the position to which they have moved. This position of elevators 18 will provide the additional lift necessary to maintain the aircraft in a compensated turn.

From Fig. 3 it can be seen that the automatic turn compensator of this invention utilizes many of the components of the flight control system which are presently available on many aircraft, for example, the position gyro 32, the accelerometer 22, and the elevator channel. Therefore, it can be seen that the automatic turn compensator of this invention provides compensated turns of an aircraft on which it is used through a simple additional circuit means to the flight control system and thereby, adds but little weight to the aircraft.

Of course, it is obvious that other modifications can be made in the circuits shown and described. Also various substitutions can be made for the components hereinbefore set forth, for example, the multiplier 14 could be in the form of a resolver, a selsyn or sine card, if desired. Also various mechanical components could be used in place of the electrical components shown. Obviously, the elevator actuator could be hydraulical rather than electrical, if desired.

Therefore, while in accordance with the patent statutes there has been shown and described the presently preferred embodiment of the invention, it will be obvious to those skilled in the art that various modifications and changes may be made without departing from the true spirit and scope of this invention as defined in the appended claims.

What is claimed as new and desired to be secured by Letters Patent of the United States is:

1. An automatic turn compensator for an aircraft comprising; a secant generator, a multiplier fed by said secant generator, a summing device fed by said secant generator, an accelerometer for generating a signal proportional to the normal acceleration of said aircraft, means feeding said signal to said summing device, an integrator operated by the output of said summing device, said integrator connected to actuate said multiplier, and the output of said multiplier connected to energize a servo means to position a control surface of the aircraft, for controlling movement of the aircraft about its pitch axis.

2. In an automatic turn compensator for an aircraft, a secant generator for generating a first signal proportional to the secant of the bank angle of said aircraft, an accelerometer means for generating a second signal proportional to the normal acceleration of said aircraft, means for combining said first and second generated signals, an integrator, said combining means providing an output to operate said integrator, a multiplier, means energizing said multiplier by said first signal, said multiplier providing an output, said integrator connected to actuate said multiplier to thereby determine the portion of the input signal to the multiplier which appears in the output, a servo means connected to actuate an elevator control surface of said aircraft and means energizing said servo means by the output of said multiplier.

3. In an automatic turn compensator for an aircraft having a movable control surface for controlling movement about the pitch axis, a servo means connected to position said control surface, a secant generator for generating a signal proportional to the secant of the bank angle of said aircraft, an accelerometer for generating a signal proportional to the normal acceleration of said aircraft, circuit means for combining said generated signals and providing an output proportional to the differences of said generated signals, motor means connected to be energized by said output, a multiplier, the input to said multiplier being said signal generated by said secant generator, said motor means actuating said multiplier to thereby determine the portion of said input which appears as the output of said multiplier and means energizing said servo means by the output of said multiplier.

4. An automatic turn compensator for an aircraft having a control surface for controlling such aircraft about its pitch axis comprising; means for generating a first signal proportional to the secant of the bank angle at which said aircraft is banked during turning flight, a multiplier, means energizing said multiplier by said first signal, a servo motor connected to position said control surface, the output of said multiplier energizing said servo motor, accelerometer means for generating a second signal proportional to the normal acceleration of said aircraft during turning flight, combining means for combining said first and second signals, an integrator, means operating said integrator by the output of said combining means, means coupling said integrator to said multiplier whereby said integrator determines the portion of said first signal which appears as the output of said multiplier.

5. An automatic turn compensator for an aircraft comprising; a secant generator for generating a first signal proportional to the secant of the bank angle of said aircraft, a multiplier circuit, means energizing said multiplier circuit by said first signal, said multiplier circuit having an output, servo motor means connected to actuate an elevator control surface of said aircraft, means energizing said servo motor means by said output of said multiplier circuit, a combining circuit, an accelerometer for generating a second signal proportional to the normal acceleration of said aircraft, means for feeding both said generated signals to said combining circuit, said combining circuit having an output, the output of said combining circuit being a signal proportional to the difference between said generated signals, a motor connected to be energized by the output of said combining circuit, said motor being operatively connected to said multiplier circuit to thereby determine the portion of said first signal which appears as the output of said multiplier circuit, said compensator being so constructed and arranged that when the output of said combining circuit is zero the output of said multiplier circuit provides the desired automatic turn compensation.

6. An automatic turn compensator for an aircraft having an elevator control surface for automatically enabling said aircraft to perform a compensated turn, said compensator comprising; a servo motor means connected to actuate said control surface, a multiplier having a fixed portion and a movable portion, the output of said multiplier connected to energize said servo motor to thereby position said control surface, a secant generator for generating a first signal proportional to the secant of the bank angle of said aircraft, circuit means energizing said multiplier by said first signal, an accelerometer for generating a second signal proportional to the angular acceleration of said aircraft, a combining circuit for combining said first and second signals, the output of said combining circuit being a signal proportional to the difference between said first and second signals, a motor energized by the output signal of said combining circuit, coupling means coupling said motor to the movable portion of said multiplier whereby said motor moves said movable portion of said multiplier to determine the portion of said first signal appearing in the output of said multiplier, said compensator being so constructed and arranged that when the output of said combining means is zero the output of said multiplier provides the desired compensated turn.

References Cited in the file of this patent
UNITED STATES PATENTS

| | | |
|---|---|---|
| 2,553,560 | Esval | May 22, 1951 |
| 2,595,309 | Slater | May 6, 1952 |
| 2,834,563 | Miller | May 13, 1958 |